US012735842B2

(12) United States Patent
Sha et al.

(10) Patent No.: US 12,735,842 B2
(45) Date of Patent: Sep. 15, 2026

(54) METHOD FOR PREPARING MULTIFUNCTIONAL ENVIRONMENTAL FRIENDLY COATING FOR WATERPROOF AND OIL-PROOF FOOD PACKAGING PAPERS BY ONE STEP METHOD AND APPLICATION THEREOF

(71) Applicant: Zhejiang University of Science and Technology, Hangzhou (CN)

(72) Inventors: Lizheng Sha, Hangzhou (CN); Feiyang Zhang, Hangzhou (CN); Daliang Guo, Hangzhou (CN); Huifang Zhao, Hangzhou (CN); Jing Li, Hangzhou (CN); Yinchao Xu, Hangzhou (CN)

(73) Assignee: Zhejiang University of Science and Technology, Hangzhou (CN)

(*) Notice: Subject to any disclaimer, the term of this patent is extended or adjusted under 35 U.S.C. 154(b) by 158 days.

(21) Appl. No.: 18/649,107

(22) Filed: Apr. 29, 2024

(65) Prior Publication Data

US 2024/0368841 A1 Nov. 7, 2024

(30) Foreign Application Priority Data

May 6, 2023 (CN) ......................... 202310503128.9

(51) Int. Cl.

| | |
|---|---|
| ***D21H 21/16*** | (2006.01) |
| ***C09D 5/02*** | (2006.01) |
| ***C09D 5/16*** | (2006.01) |
| ***C09D 105/08*** | (2006.01) |
| ***C09D 191/06*** | (2006.01) |
| ***D21H 19/12*** | (2006.01) |
| ***D21H 27/10*** | (2006.01) |

(52) U.S. Cl.

CPC ............ *D21H 21/16* (2013.01); *C09D 5/022* (2013.01); *C09D 5/1656* (2013.01); *C09D 105/08* (2013.01); *C09D 191/06* (2013.01); *D21H 19/12* (2013.01); *D21H 27/10* (2013.01)

(58) Field of Classification Search

None

See application file for complete search history.

(56) References Cited

U.S. PATENT DOCUMENTS

2005/0084677 A1* 4/2005 Domard .................. D06N 3/02 428/407

FOREIGN PATENT DOCUMENTS

| | | | |
|---|---|---|---|
| CN | 107190574 | A | 9/2017 |
| CN | 110792004 | A | 2/2020 |
| CN | 114059386 | A | 2/2022 |

* cited by examiner

*Primary Examiner* — Sheeba Ahmed

(74) *Attorney, Agent, or Firm* — George D. Morgan

(57) ABSTRACT

The method of the present invention specifically comprising following steps: adding a chitosan to an acetic acid solution, heating and stirring until clear, to obtain an acidic chitosan solution; then adding a palm wax and heating a resulting mixture to 80-100° C. with a constant temperature and a high-speed stirring for emulsification for 5-15 minutes; after the emulsification is completed, an obtained emulsion is quickly cooled to a room temperature. The present invention uses a single-layer coating method to prepare waterproof and oil-proof food cardboard, simplifying operation and achieving good waterproof, oil-proof, and antibacterial effects with a lower coating amount, thereby reducing production costs. When a coating amount is 5-10 $g/m^2$, a $Cobb_{60}$ value can reach 5-9 $g/m^2$, an oil resistance level can reach 11-12 levels, a water contact angle can reach over 130°, and an antibacterial rate can reach over 90%.

1 Claim, 9 Drawing Sheets

METHOD FOR PREPARING MULTIFUNCTIONAL ENVIRONMENTAL FRIENDLY COATING FOR WATERPROOF AND OIL-PROOF FOOD PACKAGING PAPERS BY ONE STEP METHOD AND APPLICATION THEREOF

CROSS-REFERENCE TO RELATED APPLICATIONS

The application claims priority to Chinese patent application No. 202310503128.9, filed on May 6, 2023; the entire contents of which are incorporated herein by reference.

TECHNICAL FIELD

The present invention belongs to fields of food packaging and coating technology, and specifically relates to a method for preparing multifunctional and environmentally friendly coating for waterproof and oil-proof food packaging papers by one method and an application thereof.

BACKGROUND

Food packaging is an important factor affecting food quality and safety. Among them, food packaging papers with waterproof, oil-proof, and antibacterial properties can not only prevent leakage of internal liquid substances, but also can inhibit reproduction of bacterias, achieving an effect of extending shelf life of foods. At present, in the field of waterproof and oil-proof food packaging papers, a layer of plastic film is mainly coated on the surface of the paper base or fluorine-containing waterproof and oil-proof agents are coated with glue to achieve water and oil barrier. However, membrane products have always been difficult to degrade and recycle, and fluorine-containing waterproof and oil-proof agents are provided with harmful substances to human bodies, making them difficult to meet requirements of green environmental protection. Therefore, renewable, degradable, and non-toxic biomass materials are increasingly being used to prepare waterproof and oil-proof coating for papers. Some polysaccharides, proteins, lipids and other biomass materials have good film-forming properties or polar groups, and have good barrier properties for liquids and gases. However, neither a single substance nor a single coating can achieve good waterproof and oil-proof effects at the same time. Therefore, lots of studies have focused on constructing hydrophobic and oil-proof dual coatings. However, compared to single-layer coating, double-layer coatings have significantly increased operational difficulty and production costs, making them more difficult to form large-scale production.

The technical problems to be solved by the present invention are as follows:

1. Solving Problems of Fluorine in Waterproof and Oil-Proof Papers and Difficult Degradation.

At present, in the field of waterproof and oil-proof food packaging papers, a layer of plastic film is mainly coated on the surface of the paper base or fluorine-containing waterproof and oil-proof agents are coated with glue to achieve liquids barrier. However, the coated plastics, including the degradable polymer material PLA, have always been difficult to degrade and recycle at room temperature, and fluorine-containing waterproof and oil-proof agents are not only expensive, but also have potential health hazards and environmental risks. Therefore, it is an inevitable trend that renewable, degradable and non-toxic biomass materials are widely used to prepare waterproof and oil-proof coatings for papers.

2. Solving Emulsification Problem of Palm Wax.

Emulsifiers for wax and oil can be roughly divided into ionic and non-ionic surfactants, natural emulsifiers, solid particle emulsifiers, auxiliary emulsifiers, etc. However, traditional surfactants such as SDS, Tween80, Span80, which are commonly used to emulsify wax, usually have disadvantages such as high dosage, high cost, relatively poor environmental friendliness, and biocompatibility.

3. Solving Problems that Single-Layer Coat is Difficult to Provide with High Waterproof, Oil-Proof, and Antibacterial Properties Simultaneously.

At present, many studies are committed to constructing hydrophobic and oil-proof coatings to prepare waterproof and oil-proof coatings of papers, but operation difficulties and production cost of double-layer coatings are significantly increased compared with single-layer coating, and it is more difficult to form large-scale production. At present, it is rare to use single-layer coating methods to prepare multifunctional coat with high waterproof, oil-proof, and antibacterial properties for waterproof and oil-proof food packaging papers.

Based on above reasons, this application is submitted.

SUMMARY

Based on above reasons, aiming at problems or defects existing in prior art, the present invention aims to provide a method for preparing multifunctional and environmentally friendly coating for waterproof and oil-proof food packaging papers by one method and an application thereof, and solving or at least partially solving above technical defects existing in prior art.

In order to achieve the first object of the present invention as described above, a technical solution adopted by the present invention is as follows:

A one-step method for preparing multifunctional and environmentally friendly coating for waterproof and oil-proof food packaging papers, comprising following steps:

- adding a chitosan to an acetic acid solution according to a ratio, heating and stirring until clear, to obtain an acidic chitosan solution; then, adding a palm wax to the acidic chitosan solution according to a ratio, and heating a resulting mixture to 80-100° C. with a constant temperature and a high-speed stirring for emulsification for 5-15 minutes; after the emulsification is completed, an obtained emulsion is quickly cooled to a room temperature in a cold water to obtain an environmentally friendly coating for waterproof and oil-proof food packaging papers.

Furthermore, in above technical solution, a mass fraction of anhydrous acetic acid in the acetic acid solution is preferably 1-3 wt %.

Furthermore, in above technical solution, the acetic acid solution is prepared by anhydrous acetic acid and deionized water, and a specific preparation method is as follows: an appropriate amount of deionized water is added to 1-3 g anhydrous acetic acid, and magnetic stirring for 3-5 min, to obtain the acetic acid solution with a mass fraction of about 1-3 wt %.

Furthermore, in above technical solution, a mass ratio of the chitosan to the anhydrous acetic acid is 1:1, that is, in the acidic chitosan solution, a mass fraction of the chitosan is the same as a mass fraction of the anhydrous acetic acid.

Furthermore, in above technical solution, a temperature of heating with stirring is preferably 40-50° C.

Furthermore, in above technical solution, a mass ratio of the palm wax to the chitosan is 3:7-9:1.

Furthermore, in above technical solution, an emulsification temperature is preferably 90° C., and an emulsification time is preferably 10 min.

Furthermore, in above technical solution, the high-speed stirring for emulsification uses a high-speed dispersing machine to emulsify, and a speed of the high-speed dispersing machine is 8000-12000 r/min, and a speed is preferably 10000 r/min.

Furthermore, in above technical solution, the cold water is preferably an ice water mixture, and a water temperature for a water bath is 0° C.

The second object of the present invention is to provide a multifunctional and environmentally friendly coating for waterproof and oil-proof food packaging papers prepared by above-mentioned method.

The third object of the present invention is to provide an application of the multifunctional environmentally friendly coating for preparing waterproof and oil-proof food packaging papers as described above.

A waterproof and oil-proof food packaging paper, comprising a paper body (base paper), wherein one side of the paper body is coated with a waterproof and oil-proof oil layer; the waterproof and oil-proof oil layer is obtained by coating the multifunctional environmentally friendly coating for waterproof and oil-proof food packaging papers, then drying it.

Furthermore, in above technical solution, a quantification of the waterproof and oil-proof layer is 5-10 $g/m^2$.

Furthermore, in above technical solution, the paper body is preferably white cardboard.

Furthermore, in above technical solution, a drying temperature is 90-100° C., and a drying time is 5-15 minutes.

The functions and reaction mechanisms of various raw materials used in the present invention are as follows:

Chitosan has a certain positive charge in acidic environments due to the presence of amino groups, while palm wax contains higher fatty acids. In a high-speed dispersion state, chitosan can effectively adsorb on the surface of palm wax droplets and exist stably at the interface between water and wax, preventing them from condensing and aggregating together. And they form micrometer sized palm wax particles after rapid cooling in cold water. In addition, chitosan is not only a natural macromolecular antibacterial material, its solution has certain viscosity and antibacterial properties, so it can also act as a stabilizer and antibacterial agent in emulsion, improving the stability of emulsion and extending storage time of the emulsion.

Compared with prior art, the present invention has following beneficial effects:

(1) The present invention only uses natural renewable, degradable and non-toxic biomass materials chitosan and palm wax as main raw materials to prepare waterproof and oil-proof emulsion. There are few types of raw materials and they are environmentally friendly, and will not cause harm to human body in the process of using, and easily degrade in natural environment, have no residue, and will not cause environmental pollution.

(2) The chitosan used in present invention is the only alkaline polysaccharide in natural polysaccharides, with hydrophilic amino and hydroxyl groups on its molecules as well as hydrophobic acetyl groups. In acidic system, the amino group carries a positive charge, which not only provides good oil-proof and antibacterial properties, but also acts as a surfactant to adsorb at the oil-water interface. The present invention directly emulsifies palm wax with chitosan as the emulsifier, which is used as the oil-proof and antibacterial agent, and does not need to add additional emulsifier, saves raw materials, reduces operation steps, and finally reduces production cost, and the emulsion prepared has small particle size and good stability.

(3) The emulsion of the present invention is obtained by adopting a certain amount of chitosan to emulsify the palm wax, and the palm wax particles are distributed in the chitosan emulsion in a polydispersity. The higher drying temperature after coating causes phase separation of emulsion. The palm wax particles are coagulated and agglomerated on the upper surface of the coating, resulting in a single coating after high temperature drying has a better effect than double coating. Chitosan, located in the lower layer of the coating, forms a uniform and continuous film to provide good oi-proof properties for the coating. Some of them infiltrate into the paper, improving the bonding strength between the coating and the paper. The palm wax located on the upper layer of the coating forms a flat wax film after drying in a drum dryer, which reduces surface energy while improving the waterproof performance of papers. Part of them infiltrate the chitosan film to improve the bonding strength with the chitosan film.

(4) The present invention uses a single-layer coating method to prepare waterproof and oil-proof food cardboard, simplifying operation and achieving good waterproof, oil-proof, and antibacterial effects with a lower coating amount, thereby reducing production costs. When a coating amount is 5-10 $g/m^2$, a $Cobb_{60}$ value can reach 5-9 $g/m^2$, an oil resistance level can reach 11-12 levels, a Water contact angle can reach over 130°, and an antibacterial rate can reach over 90%.

BRIEF DESCRIPTION OF DRAWINGS

In order to provide a clearer description of embodiments of the present invention or technical solutions in prior art, A brief introduction is given below to the drawings that need to be used in embodiments or prior art. It is evident that the drawings in the following description are only some embodiments of the present invention. For those skilled in the art, other drawings can be obtained from these drawings without any creative effort.

DETAILED DESCRIPTION OF THE EMBODIMENTS

Figure 1:
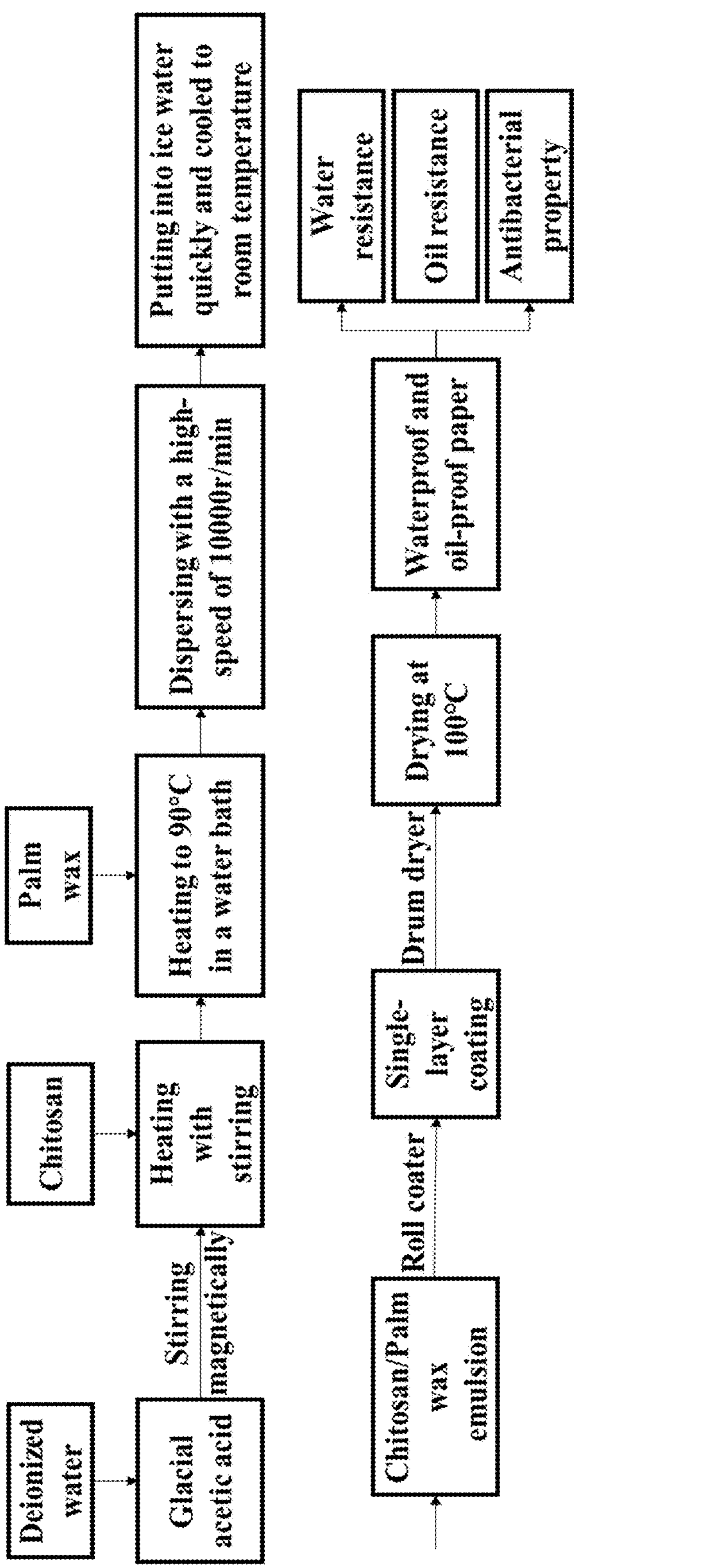
FIG. 1 shows a process flow diagram of the present invention for preparing multifunctional environmental friendly coating for waterproof and oil-proof food packaging papers and its application.

The present invention uses palm wax as hydrophobic material, and uses chitosan as oil repellent, surfactant, stabilizer and antibacterial agent to emulsify palm wax in a weak acid system to prepare a waterproof and oil-proof coating. The obtained emulsion is coated on a paper in a single layer, and then dried at high temperature with a drum dryer to obtain a paper with high contact angle and waterproof and oil-proof properties.

One of the innovations of the present invention is that the raw materials of the invention is green, environmentally friendly, non-toxic and harmless, the emulsion preparation process is simple, and the particle size is small and the stability is good. Chitosan is dissolved in acetic acid solution. Chitosan with oil-proof and antibacterial properties is directly used as emulsifier in the weak acid system without additional emulsifier. Palm wax is emulsified with a 10000 r/min high-speed disperser in a 90° C. water bath heating. After completion, it is quickly cooled in cold water to room temperature to prepare the emulsion with waterproof, oil-proof and antibacterial properties.

The second innovation of the present invention is that it uses a single-layer coating combined with a drum dryer for high-temperature drying above 90° C. to prepare waterproof and oil-proof food cardboard, simplifying the coating and drying process, and achieving good waterproof, oil-proof, and antibacterial effects with a lower coating amount, reducing the amount of coating, labor, and energy consumption, and lowering production costs. When the coating amount is 5-10 g/m$^2$, the Cobb$_{60}$ value can reach 5-9 g/m$^2$, the oil resistance level can reach 11-12 levels, the water contact angle can reach over 130°, and the antibacterial rate can reach over 90%.

The mechanism is that a water phase and an oil phase are separated at a high temperature, the oil phase floats on the top of the water phase, and forms a coating similar to a double-layer coating on the surface of the paper after solidification, providing waterproof and oil-proof properties for the surface of the paper. Compared with double-layer coating, the method of present invention is not only easy to operate, but also more stable in the bonding between coats. At the same time, due to the presence of chitosan in the coat, the paper also has good antibacterial properties, which can be used for food packaging to extend the shelf life of food.

The invention is further explained by implementation cases below. The implementation cases are carried out on the premise of the invention technology, and the detailed implementation mode and specific operation process are given to show that the invention is creative, but the scope of protection of the invention is not limited to the following implementation cases.

On the basis of the information contained in this application, various changes to the precise description of the invention can easily be made for persons skilled in the art. It should be understood that the scope of the invention is not limited to the defined processes, properties, or components, as these embodiments and other descriptions are intended only to schematic illustrate specific aspects of the invention.

In order to better understand and not limit the scope of the invention, all numbers used in this application to represent amounts, percentages, and other numerical values shall in all cases be understood to be qualified by the word "approximately". Therefore, unless otherwise stated, the numerical parameters listed in the specification are approximations, which may change depending on the desired properties that are being sought. The numerical parameters should at least be regarded as having been obtained from the reported significant figures and by conventional rounding methods.

The equipments and raw materials used in the invention can be purchased from market or are commonly used in the field. The methods in the following embodiments, unless otherwise specified, are conventional methods in this field.

The preparation and testing methods of the waterproof and oil-proof papers mentioned in following application embodiments are as follows:

(1) Preparation of a waterproof and oil-proof cardboard: take a piece of cardboard to be coated and apply it on one side in a single layer with No. 6 scraper of K303 electric coater. A coating speed is 1 m/min, a coating amount is controlled within 10 through the concentration of emulsion; and drying it in a drum dryer at 90-100° C. for 5 min-15 min, and then characterize its waterproof and oil-proof performance.

(2) Cobb value test: measuring the water absorption of paperboard in accordance with a national standard GB/T1540-2002 "measuring of water absorption of papers and paperboards (Cobb method)". A testing method calculates the differences between a weight $m_2$ after coating and a weight $m_1$ before coating according to following formula, and selects a testing time of 60 seconds.

$$C = (m_2 - m_1) \times 100;$$

(3) Oil-proof properties test: a standard Oil Kit Test-TAPPI T559 pm-12 international general test method commonly used in paper industry is used to measure the oil resistance grade of paper. The test solution of oil resistance grade according to the required ratio is shown in Table 1 below.

TABLE 1

| Serial Number | castor oil (g) | Methylbenzene (mL) | n-heptane (mL) |
|---|---|---|---|
| 1 | 969.0 | 0 | 0 |
| 2 | 872.1 | 50 | 50 |
| 3 | 775.2 | 100 | 100 |
| 4 | 678.3 | 150 | 150 |
| 5 | 581.4 | 200 | 200 |
| 6 | 484.5 | 250 | 250 |
| 7 | 387.6 | 300 | 300 |

TABLE 1-continued

| Serial Number | castor oil (g) | Methylbenzene (mL) | n-heptane (mL) |
|---|---|---|---|
| 8 | 290.7 | 350 | 350 |
| 9 | 193.8 | 400 | 400 |
| 10 | 96.9 | 450 | 450 |
| 11 | 0 | 500 | 500 |
| 12 | 0 | 450 | 550 |

(4) Water contact angle test: test the water contact angle with a contact Angle tester (DSA25, Kruss GmbH, Germany).

(5) Bacteriostatic rate test: a paper sample was weighed, cut into 1.0 cm×1.0 cm, placed in a 250 ml conical bottle, added 70 mL LB liquid medium, sterilized in an autoclave for 30 min, left for 24 h, added 5 mL *E. coli* suspension, and shook the conical bottle on a shaking table at 250 r/min for 1 h. Taked 1 mL of the shaken bacterial suspension, added it to 9 ml of liquid medium and do a 10-fold series dilution in order to calculate the number of colonies in the control sample. 40 μL of bacterial suspension was evenly coated on 90 mm solid medium, and then *E. coli* was cultured in a microbial incubator upside down. After 24 h of culturing at 37° C., the medium was photographed to obtain the colony number. Plate coating experiment was performed for each dilution of bacterial suspension to calculate the colony number. The blank sample group was added with the same weight and size as the test sample group but not coated. The no sample group does not add any paper pattern, and other operations are the same as the sample group.

The antibacterial rate X is calculated as follows:

$$X = \frac{A - B}{A} \times 100\%$$

In above formula:

A: average number of colonies in blank samples;

B: average number of colonies in the sample.

Embodiment 1

A one-step method for preparing multifunctional and environmentally friendly coating for waterproof and oil-proof food packaging papers in this embodiment, comprising following steps:

94 g deionized water was added to 3 g anhydrous acetic acid, stirred magnetically for 5 min, then 3 g chitosan was added, heated at 40-50° C. with stirring magnetically until it was clarified, and a chitosan solution with mass fraction of 3 wt % was obtained under acidic system. 27 g palm wax (i.e., by a mass ratio of palm wax to chitosan 9:1) was added to the chitosan solution and a water bath was heated to 90° C. Emulsification was performed for 10 min with a 10000 r/min high-speed disperser in the water bath at 90° C. An emulsion obtained by emulsification is quickly put into ice water and cooled to room temperature, obtained a waterproof and oil-proof emulsion, that is, the environmentally friendly coating for waterproof and oil-proof food packaging papers.

Embodiment 2

A one-step method for preparing multifunctional and environmentally friendly coating for waterproof and oil-proof food packaging papers in this embodiment, comprising following steps:

98 g deionized water was added to 1 g anhydrous acetic acid, stirred magnetically for 3 min, then 1 g chitosan was added, heated at 40-50° C. with stirring magnetically until it was clarified, and a chitosan solution with mass fraction of 1 wt % was obtained under acidic system. 4 g palm wax (i.e., by a mass ratio of palm wax to chitosan 8:2) was added to the chitosan solution and a water bath was heated to 90° C. Emulsification was performed for 10 min with a 10000 r/min high-speed disperser in the water bath at 90° C. An emulsion obtained by emulsification is quickly put into ice water and cooled to room temperature, obtained a waterproof and oil-proof emulsion, that is, the environmentally friendly coating for waterproof and oil-proof food packaging papers.

Embodiment 3

A one-step method for preparing multifunctional and environmentally friendly coating for waterproof and oil-proof food packaging papers in this embodiment, comprising following steps:

96 g deionized water was added to 2 g anhydrous acetic acid, stirred magnetically for 3 min, then 2 g chitosan was added, heated at 40-50° C. with stirring magnetically until it was clarified, and a chitosan solution with mass fraction of 2 wt % was obtained under acidic system. 18 g palm wax (i.e., by a mass ratio of palm wax to chitosan 9:1) was added to the chitosan solution and a water bath was heated to 90° C. Emulsification was performed for 10 min with a 10000 r/min high-speed disperser in the water bath at 90° C. An emulsion obtained by emulsification is quickly put into ice water and cooled to room temperature, obtained a waterproof and oil-proof emulsion, that is, the environmentally friendly coating for waterproof and oil-proof food packaging papers.

Embodiment 4

A one-step method for preparing multifunctional and environmentally friendly coating for waterproof and oil-proof food packaging papers in this embodiment, comprising following steps:

96 g deionized water was added to 2 g anhydrous acetic acid, stirred magnetically for 3 min, then 2 g chitosan was added, heated at 40-50° C. with stirring magnetically until it was clarified, and a chitosan solution with mass fraction of 2 wt % was obtained under acidic system. 10 g palm wax (i.e., by a mass ratio of palm wax to chitosan 10:2) was added to the chitosan solution and a water bath was heated to 90° C. Emulsification was performed for 10 min with a 10000 r/min high-speed disperser in the water bath at 90° C. An emulsion obtained by emulsification is quickly put into ice water and cooled to room temperature, obtained a waterproof and oil-proof emulsion, that is, the environmentally friendly coating for waterproof and oil-proof food packaging papers.

Figure 2:
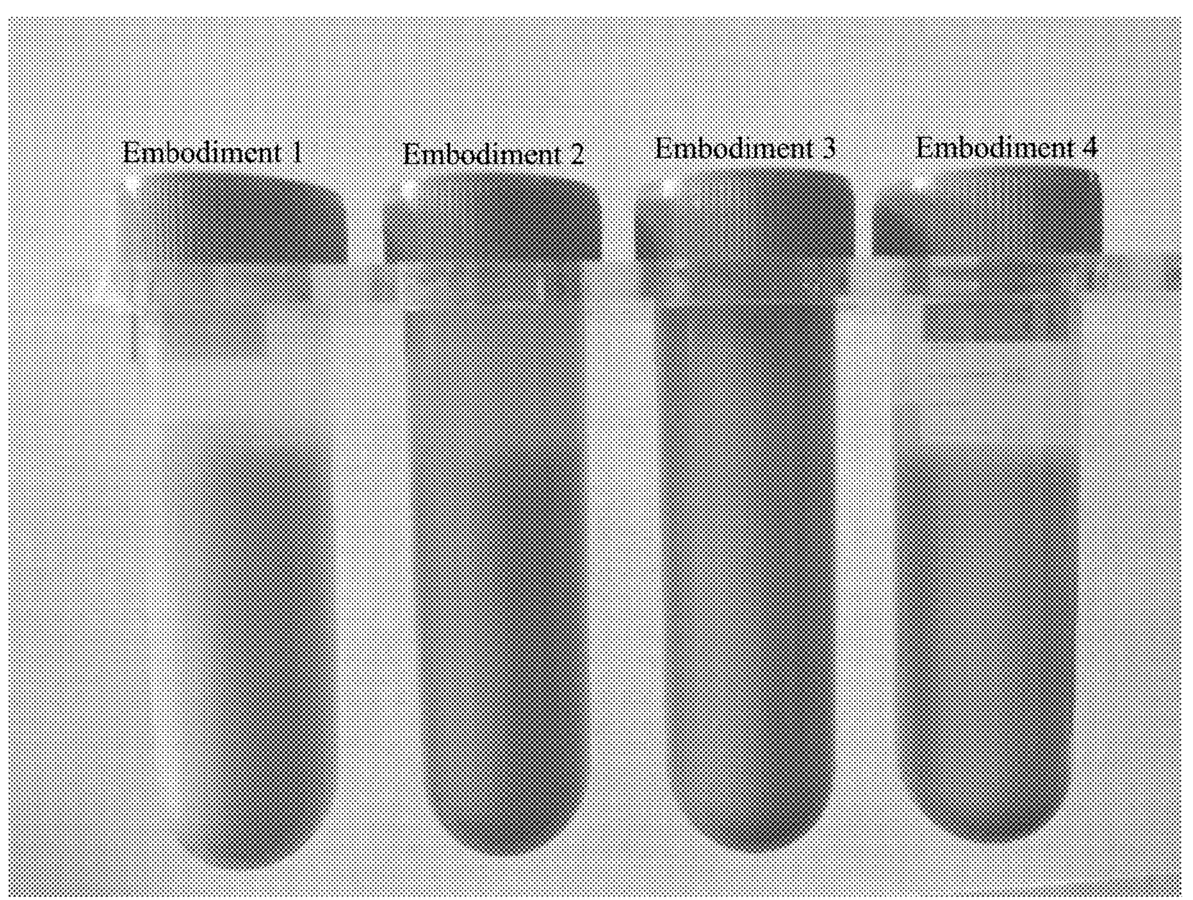
FIG. 2 shows a physical photo of a multifunctional and environmentally friendly coating for waterproof and oil-proof food packaging papers prepared in Embodiments 1-4 after being placed for 2 weeks.

Structural Test:

FIG. 2 is a physical photo of the multifunctional environmentally friendly coating (emulsion) for waterproof and oil-proof food packaging papers prepared by embodiments 1-4 after being placed for 2 weeks; It can be seen from FIG. 2 that the emulsion prepared by each embodiment were not obviously stratified, indicating that the emulsion has good stability.

Figure 3:
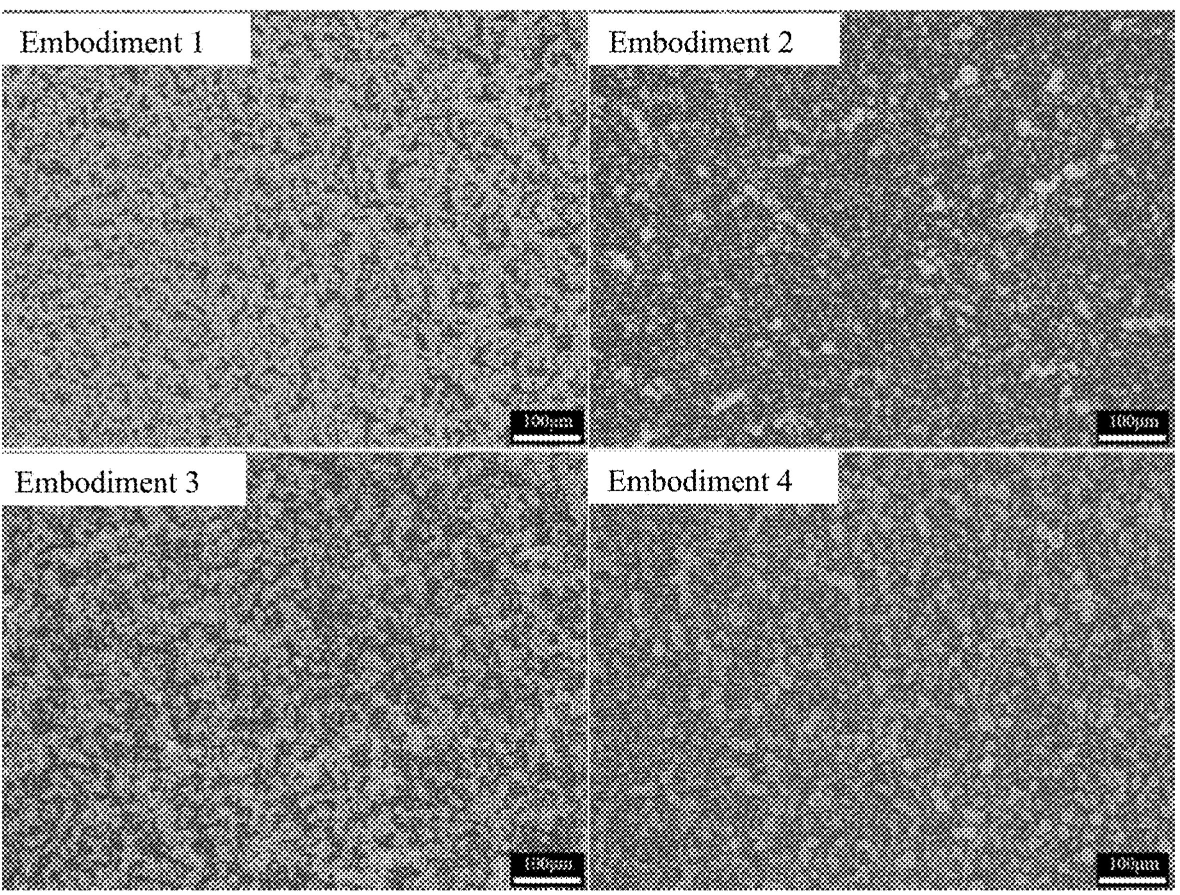
FIG. 3 shows a state diagram of palm wax particles in the multifunctional environmentally friendly coating for waterproof and oil-proof food packaging papers prepared in Embodiments 1-4 under a 1000× microscope.

FIG. 3 shows the state diagrams of palm wax particles in the multifunctional environmental friendly coating (emulsion) for waterproof and oil-proof food packaging paper prepared by embodiments 1, 2, 3, and 4 under a 1000-fold microscope. As can be seen from FIG. 3, the palm wax particles exhibit a more regular spherical appearance, with uniform particle size and stable emulsion state.

Application Embodiment 1

The waterproof and oil-proof emulsion of Embodiment 1 was used to prepare a waterproof and oil-proof food packaging paper, a specific application method was as follows:

taking a piece of white cardboard, applying a single-layer coat on one side of the cardboard by No. 6 scraper of a K303 electric coating machine with a coating speed 1 m/min and a coating amount 9.5 g/m$^2$. taking into a 90-100° C. drum dryer drying for 10 min, to obtain the waterproof and oil-proof food packaging paper. Then the waterproof and oil-proof properties were characterized. A water contact angle of the paper was 130.9°, a Cobb$_{60}$ value was 7.7 g/m$^2$, a kit rating was 12, and a antibacterial rate was 92.7%.

Application Embodiment 2

The waterproof and oil-proof emulsion of Embodiment 2 was used to prepare a waterproof and oil-proof food packaging paper, a specific application method was as follows: taking a piece of white cardboard, applying a single-layer coat on one side of the cardboard by No. 6 scraper of a K303 electric coating machine with a coating speed 1 m/min and a coating amount 7.5 g/m$^2$. taking into a 90-100° C. drum dryer drying for 10 min, to obtain the waterproof and oil-proof food packaging paper. Then the waterproof and oil-proof properties were characterized. A water contact angle of the paper was 136.3°, a Cobb$_{60}$ value was 8.6 g/m$^2$, a kit rating was 12, and a antibacterial rate was 93.4%.

Application Embodiment 3

The waterproof and oil-proof emulsion of Embodiment 3 was used to prepare a waterproof and oil-proof food packaging paper, a specific application method was as follows:

taking a piece of white cardboard, applying a single-layer coat on one side of the cardboard by No. 6 scraper of a K303 electric coating machine with a coating speed 1 m/min and a coating amount 8.5 g/m$^2$. taking into a 90-100° C. drum dryer drying for 10 min, to obtain the waterproof and oil-proof food packaging paper. Then the waterproof and oil-proof properties were characterized. A water contact angle of the paper was 136.5°, a Cobb$_{60}$ value was 9.0 g/m$^2$, a kit rating was 11, and a antibacterial rate was 92.3%.

Application Embodiment 4

The waterproof and oil-proof emulsion of Embodiment 4 was used to prepare a waterproof and oil-proof food packaging paper, a specific application method was as follows:

taking a piece of white cardboard, applying a single-layer coat on one side of the cardboard by No. 6 scraper of a K303 electric coating machine with a coating speed 1 m/min and a coating amount 6.5 g/m$^2$. taking into a 90-100° C. drum dryer drying for 10 min, to obtain the waterproof and oil-proof food packaging paper. Then the waterproof and oil-proof properties were characterized. A water contact angle of the paper was 130.2°, a Cobb$_{60}$ value was 7.8 g/m$^2$, a kit rating was 12, and a antibacterial rate was 93.1%.

Application Embodiment 5

The waterproof and oil-proof emulsion of Embodiment 4 was used to prepare a waterproof and oil-proof food packaging paper, a specific application method was as follows:

taking a piece of grey background white cardboard, applying a single-layer coat on one side of the cardboard by No. 6 scraper of a K303 electric coating machine with a coating speed 1 m/min and a coating amount 6.5 g/m$^2$. taking into a 90-100° C. drum dryer drying for 10 min, to obtain the waterproof and oil-proof food packaging paper. Then the waterproof and oil-proof properties were characterized. A water contact angle of the paper was 132.4°, a Cobb$_{60}$ value was 7.3 g/m$^2$, a kit rating was 12, and a antibacterial rate was 93%.

Figure 4:
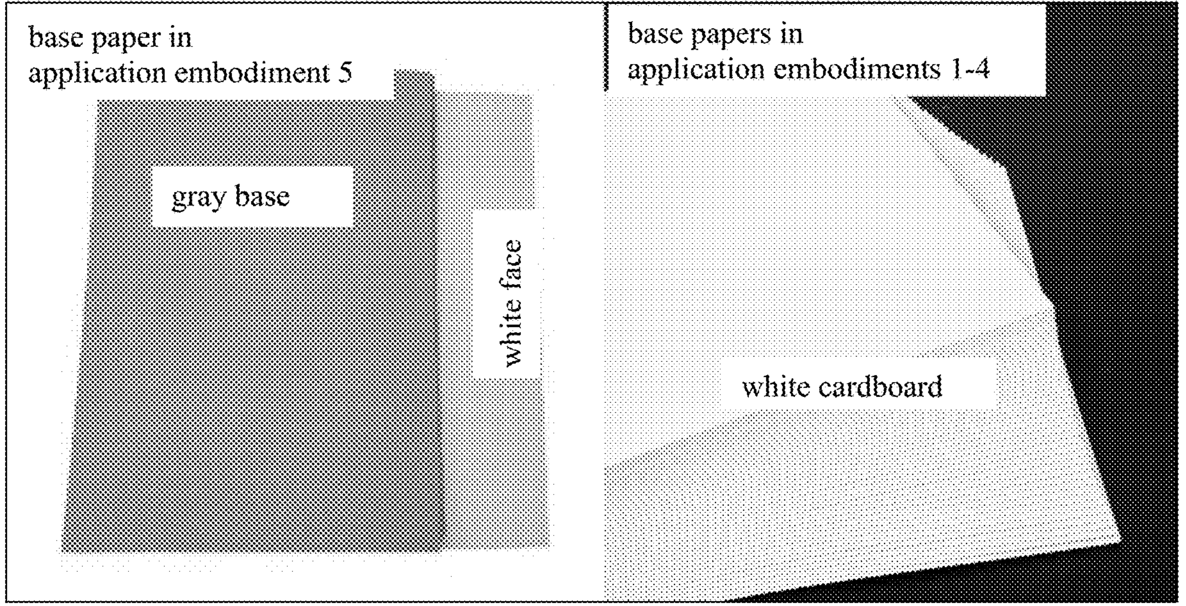
FIG. 4 shows a physical image of the paper body (base paper) used in Application Embodiments 1-5.

FIG. 4 shows the base paper used in application embodiments, wherein the grey background white cardboard on left side was the base paper used in application embodiment 5, and the white cardboard on right side was the base paper used in application embodiments 1, 2, 3, and 4.

Figure 5:
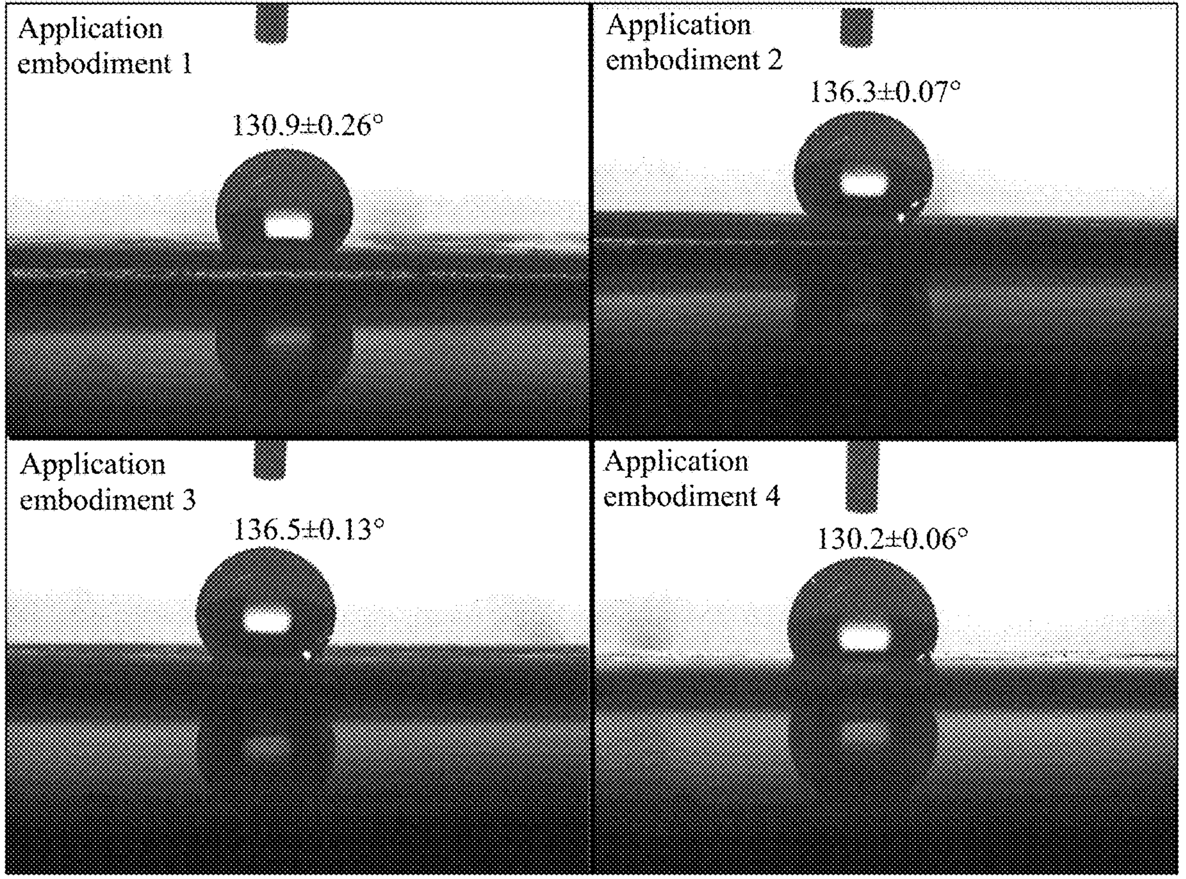
FIG. 5 shows the water contact angle test results of the waterproof and oil-proof food packaging papers prepared in Application Embodiments 1-4.

FIG. 5 shows the test results of water contact angle of the waterproof and oil-proof food packaging papers prepared by application of embodiments 1, 2, 3, and 4. It can be seen from FIG. 5 that the water contact angle of each embodiment was above 130° and was provided with good hydrophobic performance.

Figure 6:
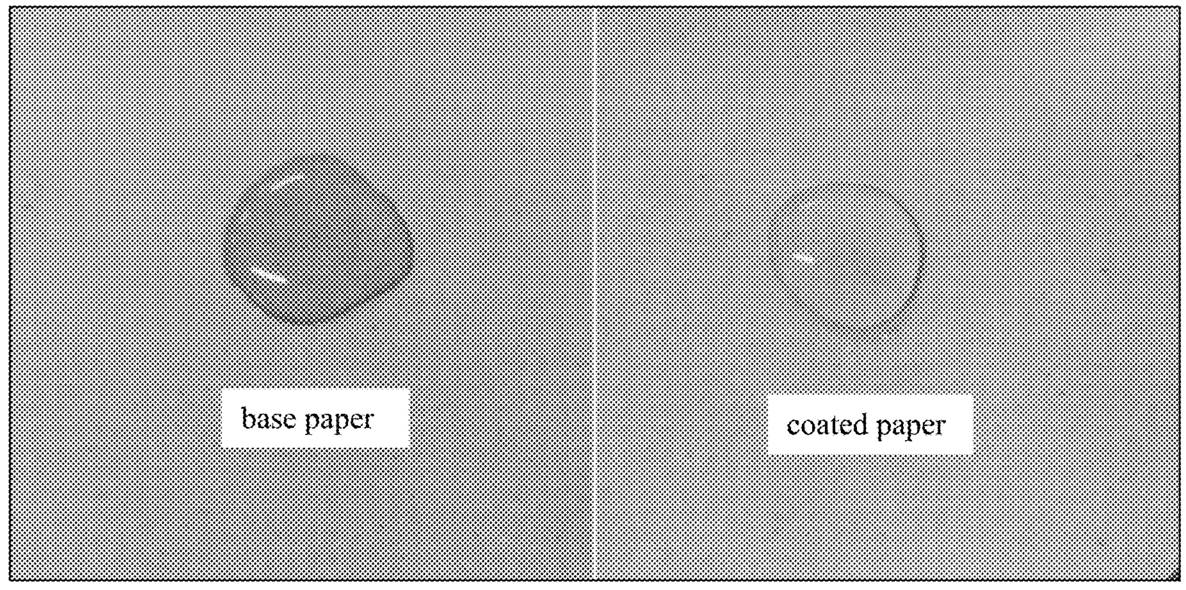
FIG. 6 shows a comparison of the surface states of the greyback board base paper and the prepared waterproof and oil-proof food packaging paper used in Application Embodiment 5 when water is just dripping.

FIG. 6 shows a comparison of the surface states of the greyback board base paper and the prepared waterproof and oil-proof food packaging paper used in Application Embodiment 5 when water is just dripping. As can be seen from FIG. 6, when water is just dripping, the water has begun to permeate the base paper, while the coated greyback board has not been significantly permeated by water.

Figure 7:
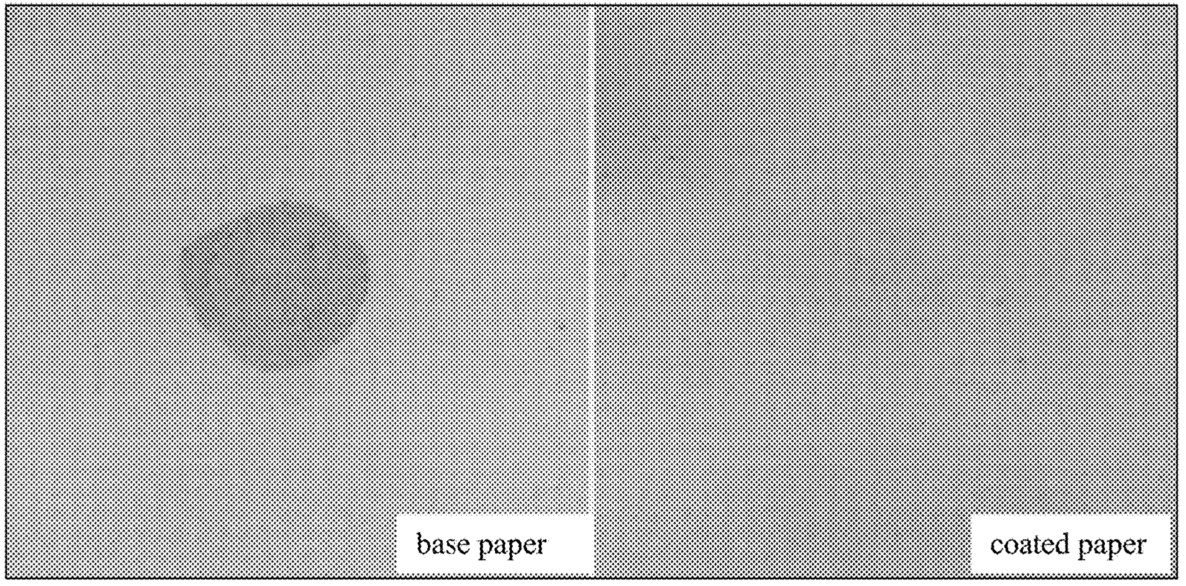
FIG. 7 shows a comparison of states between the greyback board base paper and the waterproof and oil-proof food packaging paper prepared in Application Embodiment 5 after wiping the surface with water dripping for 5 minutes.

FIG. 7 shows a comparison of states between the greyback board base paper and the waterproof and oil-proof food packaging paper prepared in Application Embodiment 5 after wiping the surface with water dripping for 5 minutes. As can be seen from FIG. 7, there are still obvious water marks on surface of the base paper after erasing, while there are no obvious water marks on the greyback board after coating. Therefore, the coated paper has a good waterproof effect.

Figure 8:
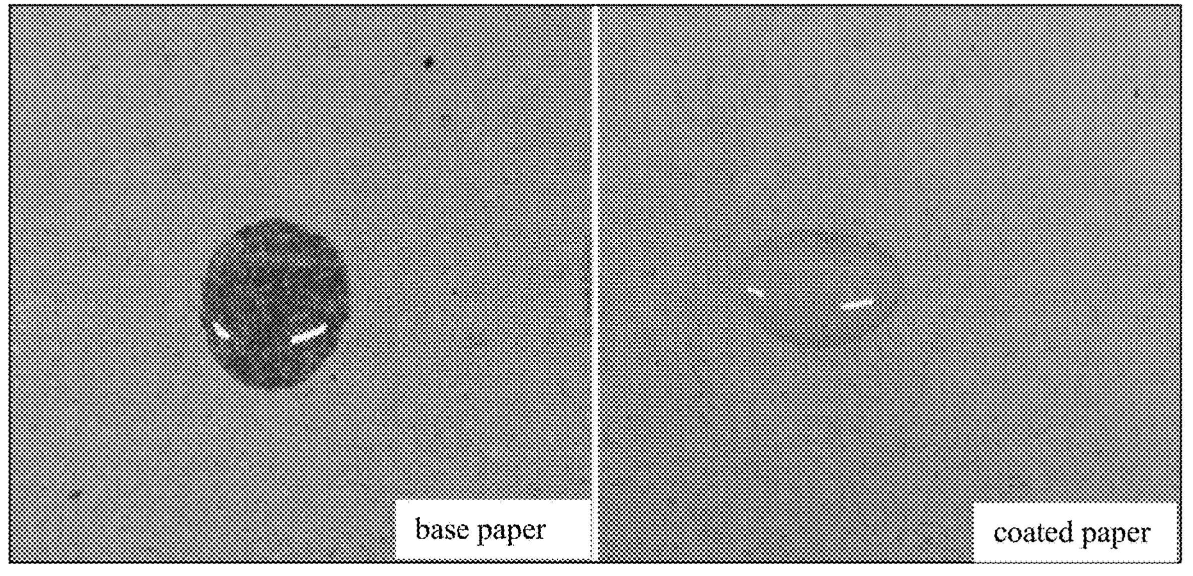
FIG. 8 shows a comparison of states between the greyback board base paper and the prepared waterproof and oil-proof food packaging paper in Application Embodiment 5 after dripping grade 1 oil-proof test fluid (castor oil) on the surface.

FIG. 8 shows a comparison of states between the greyback board base paper and the prepared waterproof and oil-proof food packaging paper in Application Embodiment 5 after dripping grade 1 oil-proof test fluid (castor oil) on the surface; As can be seen from FIG. 8, the base paper is quickly penetrated after dropping the test solution, while the coated greyback board has no obvious permeation. Therefore, the oil proof grade of the greyback board base paper is 0.

Figure 9:
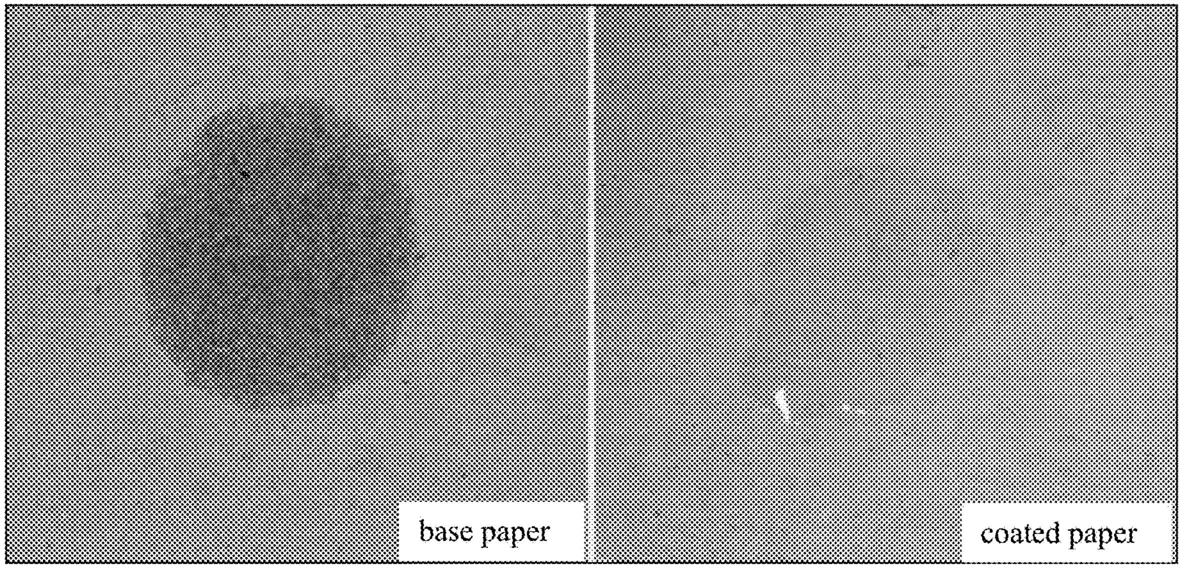
FIG. 9 shows a comparison diagram of states between the greyback board base paper and the prepared waterproof and oil-proof food packaging paper after dripping 12 grade oil-proof liquid on the surface.

FIG. 9 shows a comparison diagram of states between the greyback board base paper and the prepared waterproof and oil-proof food packaging paper after dripping 12 grade oil-proof liquid on the surface. As can be seen from FIG. 9, the base paper is quickly penetrated after dropping the test solution, while the coated greyback board has no obvious permeation. Therefore, after coating, the greyback board has an oil proof grade of 12, which has excellent oil proof effect.

What is claimed is:

1. A waterproof and oil-proof food packaging paper, comprising a paper body, wherein one side of the paper body is coated with a waterproof and oil-proof oil layer; the waterproof and oil-proof oil layer is obtained by coating the multifunctional environmentally friendly coating for waterproof and oil-proof food packaging papers prepared by a one-step method, then drying it;

a preparation method of the multifunctional environmentally friendly coating for waterproof and oil-proof food packaging paper is as follows:

adding a chitosan to an acetic acid solution according to a ratio, heating and stirring until clear, to obtain an acidic chitosan solution; then, adding a palm wax to the acidic chitosan solution according to a ratio, and heating a resulting mixture to 90° C. with a constant temperature and a high-speed stirring for emulsification for 10 minutes; after the emulsification is completed, an obtained emulsion is quickly cooled to a room temperature in a cold water to obtain an environmentally friendly coating for waterproof and oil-proof food packaging papers;

the mass fraction of anhydrous acetic acid in the acetic acid solution is 1-3 wt %;

the mass ratio of chitosan to anhydrous acetic acid is 1:1;

the mass ratio of palm wax to chitosan is 5:1;

a drying temperature is 90-100° C., and a drying time is 5-15 minutes;

a quantification of the waterproof and oil-proof layer is 6.5 g/$m^2$.

* * * * *